(12) United States Patent
Schondorf et al.

(10) Patent No.: US 7,775,195 B2
(45) Date of Patent: Aug. 17, 2010

(54) METHOD FOR FUEL VAPOR CANISTER PURGING

(75) Inventors: Steven Schondorf, Dearborn, MI (US); Tom Watson, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 720 days.

(21) Appl. No.: 11/743,885

(22) Filed: May 3, 2007

(65) Prior Publication Data
US 2008/0271718 A1    Nov. 6, 2008

(51) Int. Cl.
*F02M 33/02* (2006.01)
(52) U.S. Cl. .................................................. 123/520
(58) Field of Classification Search ......... 123/518–520, 123/179.16
See application file for complete search history.

(56) References Cited

U.S. PATENT DOCUMENTS

| 5,647,332 | A | 7/1997 | Hyodo et al. |
| 5,962,927 | A * | 10/1999 | Inada et al. ............ 290/40 R |
| 6,230,558 | B1 | 5/2001 | Miwa et al. |
| 6,382,191 | B1 * | 5/2002 | Curran et al. ............ 123/518 |
| 6,557,534 | B2 | 5/2003 | Robichaux et al. |
| 2007/0131204 | A1 * | 6/2007 | Chae ........................ 123/520 |

FOREIGN PATENT DOCUMENTS

JP    10122009    5/1998

* cited by examiner

*Primary Examiner*—M. McMahon
(74) *Attorney, Agent, or Firm*—Allan J. Lippa; Alleman Hall McCoy Russell & Tuttle LLP

(57) ABSTRACT

A method of controlling fuel vapor purging in a hybrid electric vehicle capable of selectively operating an engine includes initiating purging in response to an amount of liquid fuel residing in a fuel tank of the hybrid electric vehicle and a duration since the previous fuel tank filling event.

6 Claims, 8 Drawing Sheets

METHOD FOR FUEL VAPOR CANISTER PURGING

FIELD OF THE INVENTION

The present application relates to a method for fuel vapor purging, specifically the application relates to a method for fuel vapor purging in a hybrid electric vehicle.

BACKGROUND AND SUMMARY

During vehicle operation, fuel vapor may be generated in the fuel system of a vehicle due to heat generated from engine operation, for example. As the amount of fuel vapor increases pressure in the fuel system may increase. In order to regulate the fuel system pressure, fuel vapor may be released from the fuel system. However, releasing fuel vapor to the atmosphere causes an increase in fuel vapor emissions. Accordingly, the fuel system may include a fuel vapor canister to filter fuel vapor upon release from the fuel system to prevent the release of fuel vapor emissions. Eventually, the fuel vapor canister may become filled with an amount of fuel vapor. The fuel canister may be cleared of fuel vapor by way of a purging operation. A fuel vapor purging operation may include opening a purge valve located in the manifold of the internal combustion engine to introduce the fuel vapor into the cylinder(s) of the internal combustion engine for combustion so that fuel economy may be maintained and fuel vapor emissions may be reduced. Thus, during a fuel vapor purge operation the internal combustion engine is required to be operating in order to provide engine vacuum to draw the fuel vapor from the fuel vapor canister into the cylinder(s) as well as to provide combustion for the fuel vapor.

In a hybrid electric vehicle, in order to achieve gains in fuel economy and powertrain efficiency the internal combustion engine may not always be operating. Accordingly, the opportunity for fuel vapor purging may be limited even though fuel vapor may still be accumulating in the fuel vapor canister.

One approach to control fuel vapor purge involves purging based on the fuel tank pressure and the amount of time since the last purge operation. Based on one or more of those indicators exceeding a threshold, the internal combustion engine may be turned on so that the fuel vapor canister may be purged. See, for example, U.S. Pat. No. 6,557,534.

However, the inventors herein have recognized that the above approach has some issues. In particular, under some conditions, the internal combustion engine may be started unnecessarily in order to perform the fuel vapor purge operation. For example, since the above approach only purges when the fuel vapor canister is substantially full hybrid electric operation may be interrupted unnecessarily in order to perform a purging operation. By turning on the internal combustion engine solely to perform a purge operation the operating efficiency of the hybrid electric vehicle may be reduced since additional fuel may be consumed to start the engine, for example. Furthermore, an increase in engine start events may reduce operating transparency to the vehicle operator.

The above issues may be addressed by, in one example, a method of controlling fuel vapor purging in a hybrid electric vehicle capable of selectively operating an internal combustion engine, the method comprising: determining a fuel tank condition parameter based on an amount of liquid fuel residing in a fuel tank of the hybrid electric vehicle and a duration since a previous fuel tank filling event; in response to the fuel tank condition parameter exceeding a threshold limit, initiating operation of the internal combustion engine and purging fuel vapor from the fuel vapor canister for a predetermined duration; and in response to the fuel tank condition parameter being less than the threshold limit, selectively purging fuel vapor from the fuel vapor canister based on an engine operating condition.

Thus, by performing fuel vapor purging based on the condition of the fuel tank, the state of the fuel vapor canister may be regulated to prevent fuel vapor emissions from being released to the atmosphere and operating the internal combustion engine only for fuel vapor purging purposes may be reduced which, in turn, may increase the operating efficiency of the hybrid vehicle. In particular, by considering the condition of the fuel tank, and more specifically, estimating an amount of transferable fuel vapor residing in the fuel tank based on the amount of liquid fuel in the tank, fuel vapor purging operations may be performed with increased precision. Further, by estimating the likelihood of a fuel tank filling event occurring based on a duration since a previous fuel tank filling event, a determination may be made to prioritize hybrid electric operation in favor of fuel vapor purging operation in order to improve operating efficiency of the hybrid electric vehicle. For example, if a fuel tank is substantially full of liquid fuel and fuel vapor purging has occurred, the fuel vapor purge frequency, rate, and/or duration may be reduced since the likelihood of a fuel tank filling event is low. As another example, as the amount of liquid in the fuel tank decreases the amount of fuel vapors residing in the fuel tank increases as well as the likelihood of the fuel tank being filled, thus, the purge frequency, rate, and/or duration may be increased in order to create space in the fuel vapor canister to handle an addition of fuel vapor entering the fuel vapor canister upon a fuel tank filling event.

Furthermore, by considering the condition of the fuel tank, the fuel vapor purge rate may be adjusted to match engine operating conditions so that the engine does not have to be adjusted strictly for fuel vapor purging purposes which may reduce operating transparency to the vehicle operator. In other words, fuel vapor purging may be performed opportunistically to meet vehicle operating conditions. In this way, fuel vapor emissions may be regulated without decreasing the operating efficiency of the hybrid vehicle and providing improved operating transparency to the vehicle operator.

DETAILED DESCRIPTION

This disclosure outlines a strategy for fuel vapor purging that can be applied to an engine system of a vehicle to improve engine operating efficiency. In particular, the fuel vapor purge strategy may adjust purging to deviate from an aggressive or prioritized purge that may interrupt efficient engine operation to an opportunistic purge approach which favors efficient engine operation based on known fuel system and engine operating parameters. The fuel vapor purge strategy may result in improved robustness and increased operating efficiency of the engine with improved operating transparency to the vehicle operator. In some embodiments, the fuel vapor strategy may be applied to a hybrid electric vehicle.

Figure 1:
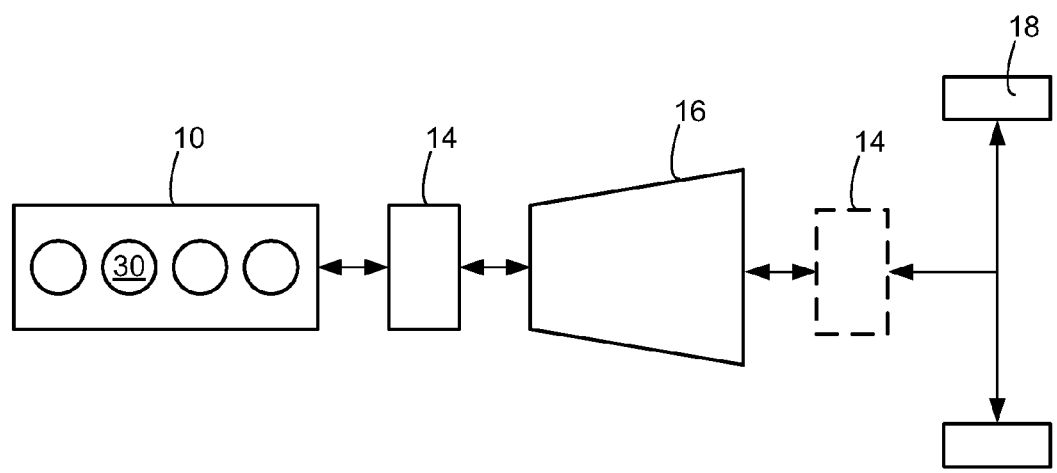
FIG. 1 is a schematic diagram of a hybrid propulsion system of the present disclosure.

FIG. 1 schematically illustrates an example embodiment of a hybrid propulsion system for a vehicle. The hybrid propulsion system may include at least an internal combustion engine 10 having one or more cylinders 30, a transmission 16, drive wheels 18 or other suitable device for delivering propulsive force to the ground surface, and one or more motors 14. In this way, the vehicle may be propelled by at least one of the engine or motor.

With regards to a full series type hybrid propulsion system, the engine may be operated to generate a form of energy suitable for use by the one or more motors. For example, with a full series type hybrid electric vehicle (HEV), the engine may generate electricity via a motor/generator that may be used to power an electric motor for propelling the vehicle. As another example, an engine may be operated to provide pump work to a hydraulic or pneumatic system that may be used to power a hydraulic or pneumatic motor for propelling the vehicle. As yet another example, an engine may be operated to provide kinetic energy to a flywheel or similar device for later application at the drive wheels.

With regards to a parallel type hybrid propulsion system, the engine and one or more motors may be operated independently of each other. As one example, an engine may be operated to provide torque to the drive wheels, while a motor (e.g. electric, hydraulic, etc.) may be selectively operated to add or remove torque delivered to the wheels. As another example, the engine may be operated without the motor or the motor may be operated without the engine.

Further, with either series or parallel type propulsion systems, or combinations thereof, an energy storage device may be included to enable energy generated by the engine and/or motor to be stored for later use by the motor. For example, a regenerative braking operation may be performed, where a motor/generator is used to convert kinetic energy at the drive wheels to a form of energy suitable for storage at the energy storage device. For example, with regards to a HEV, the motor or a separate generator may be used to convert torque at the wheels or torque produced by the engine into electrical energy that may be stored at the energy storage device. A similar approach may be applied to other types of hybrid propulsion systems including hydraulic, pneumatic, or those including flywheels.

In the illustrated example, one or more of motors 14 may be operated to supply or absorb torque from the driveline with or without torque being provided by the engine. Still other configurations are possible. Therefore, it should be appreciated that other suitable hybrid configurations or variations thereof may be used with regards to the approaches and methods described herein.

Figure 2:
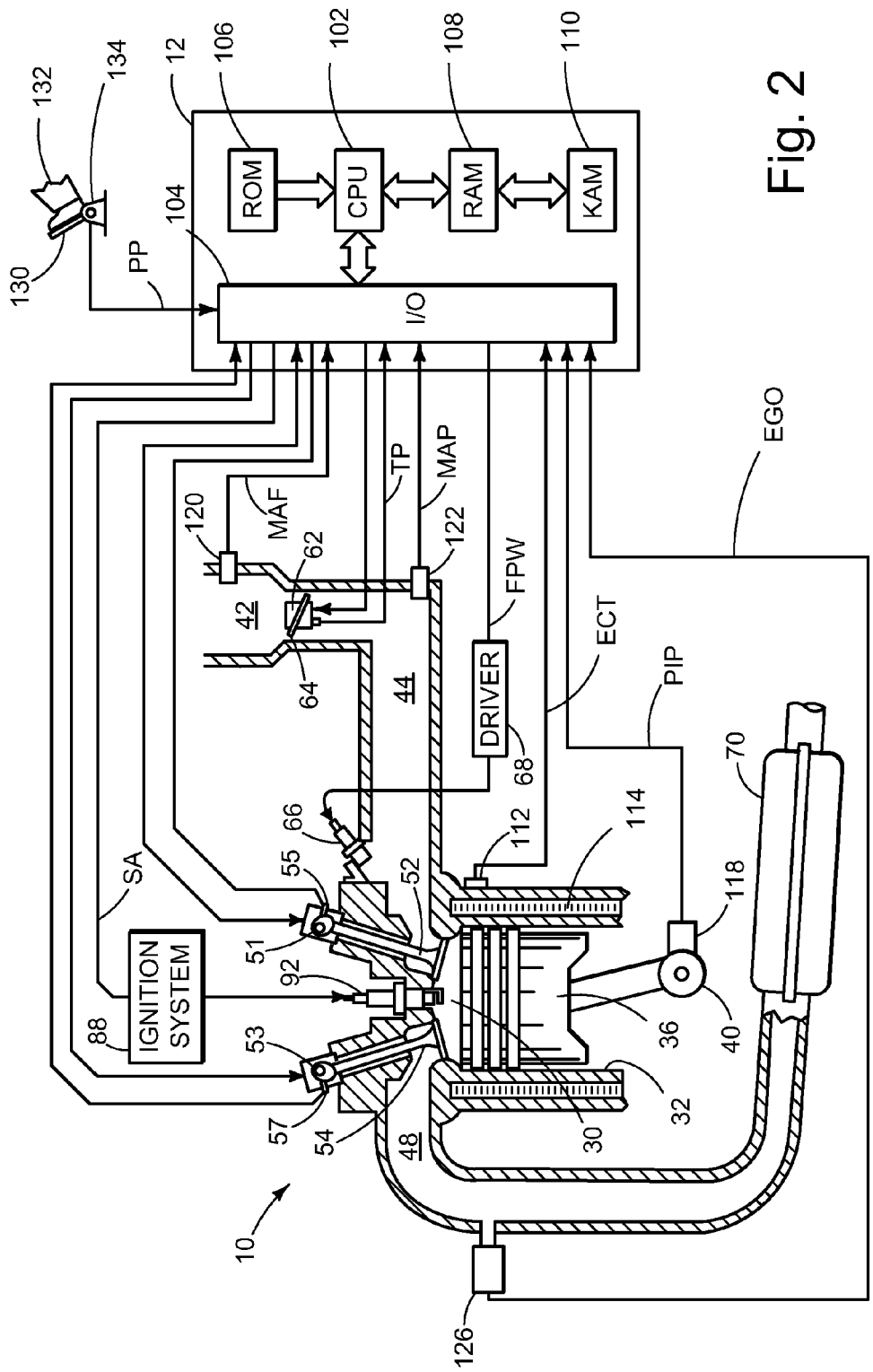
FIG. 2 is a schematic diagram of an exemplary embodiment of an engine.

Referring now to FIG. 2, one cylinder of a multi-cylinder engine is illustrated, as well as the intake and exhaust path connected to that cylinder. Engine 10 as illustrated and described herein may be included in a vehicle such as a road automobile, among other types of vehicles. In some examples, engine 10 may be included as a portion of a hybrid propulsion system including one or more other motors or engines, such as in the case of a hybrid electric vehicle (HEV). While the example applications of engine 10 will be described with reference to a vehicle, it should be appreciated that engine 10 may be used in other applications not necessarily confined to vehicle propulsion systems. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10.

Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is arranged in intake passage 44 for injecting fuel therein in proportion to the pulse width of signal FPW received from controller 12 via electronic driver 68. In this manner, fuel injector 66 provides what is known as port injection of fuel which can be combusted into combustion chamber 30. Fuel may be delivered to fuel injector 66 by a fuel system discussed in further detail below with reference to FIG. 3. In some embodiments, combustion chamber 30 may alternatively or additionally include a fuel injector arranged in cylinder 30 in a configuration that provides what is known as direct injection of fuel into the combustion chamber.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 2 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

As described above, FIG. 2 shows only one cylinder of a multi-cylinder engine, and that each cylinder may similarly include its own set of intake/exhaust valves, fuel injector, spark plug, etc.

Figure 3:
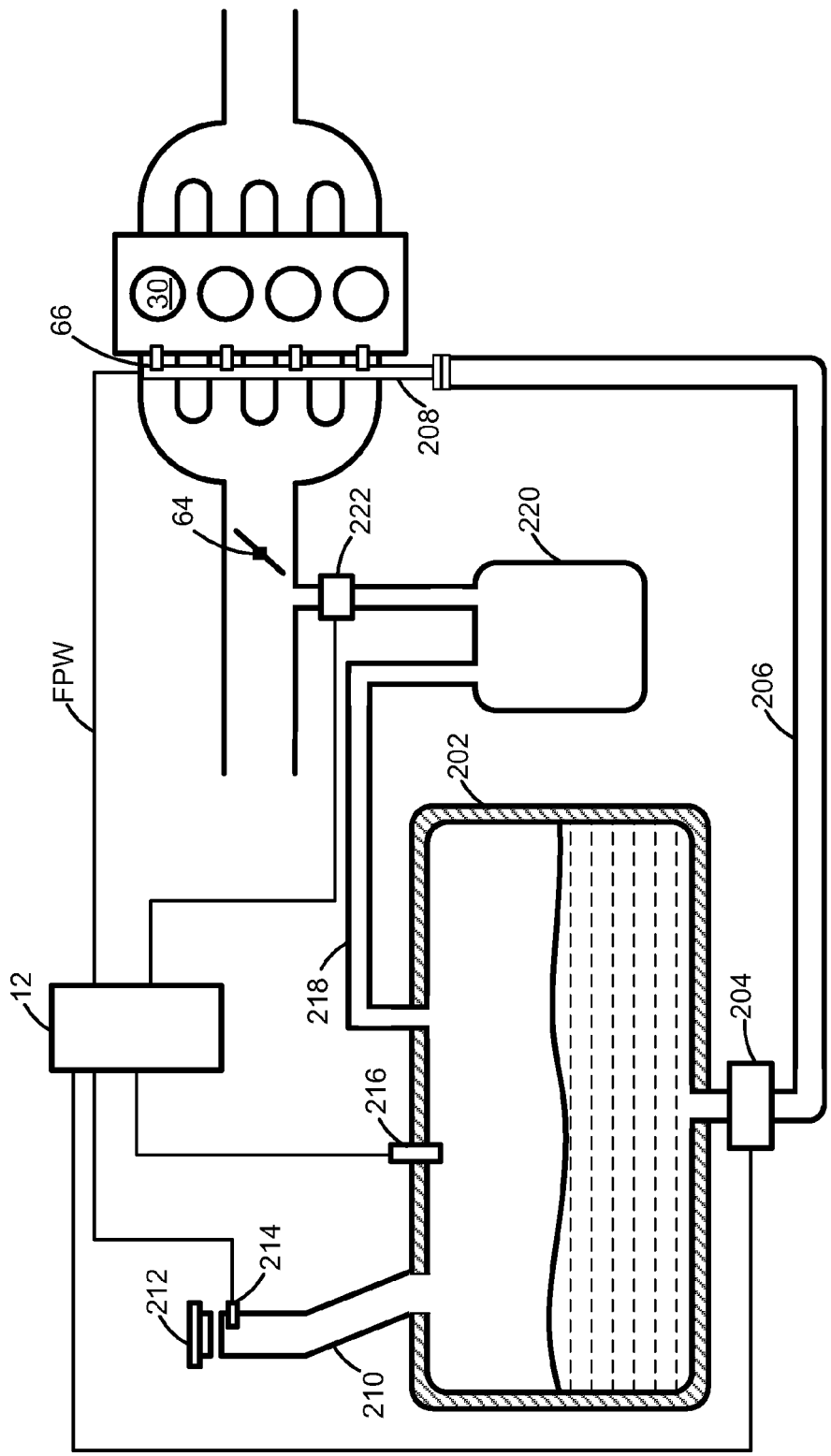
FIG. 3 is a schematic diagram of an exemplary embodiment of a fuel system.

Referring now to FIG. 3, an exemplary embodiment of a fuel system is illustrated. Fuel system 200 includes fuel storage tank 202. Fuel may be pumped from fuel storage tank 202 through fuel delivery pipe 206 to fuel rail 208 via fuel pump 204. Fuel rail 208 may disperse fuel to fuel injectors 66 according to signal FPW from controller 12 to be injected into the ports of cylinder(s) 30. Fuel tank 202 includes filling tube 210 for receiving fuel. Fuel filling tube 210 may be configured to extend away from fuel tank 202 to the external edge of the body of the vehicle so that it is accessible by a vehicle operator to fill the fuel tank. Fuel filling tube 210 may be fitted with a fuel cap 212 which may be removed during fuel tank filling. Fuel cap 212 may be configured to create a vapor-tight seal when connected to fuel filling tube 210 such that fuel vapor may be prevented from escaping from the fuel filling tube and the fuel tank. Fuel cap sensor 214 may be positioned in a sidewall of fuel filling tube 210. Fuel cap sensor 214 may send signals to controller 12 indicating that fuel 210 cap has been removed or that the fuel cap is in an orientation that seals fuel tube 210. The fuel cap sensor signals may be used as part of an exemplary fuel vapor purge strategy discussed in further detail below with reference to FIGS. 4-7.

In some embodiments, the fuel system may not include a removable fuel cap but rather may include a one way seal disposed in the end of the fuel filling tube. In such a configuration, a sensor may be included in the fuel system to detect when a fuel dispensing device enters the seal to dispense liquid fuel to the fuel tank. It should be appreciated that other suitable seal devices may be used to seal fuel filling tube.

The liquid fuel level in fuel tank 202 may be determined by controller 12 using sensor measurements. For example, in some embodiments, a liquid fuel level measuring device (not shown) that floats on the surface of the liquid fuel in the tank may determine the volume of liquid fuel in the tank. Further, in some embodiments, sensor 216 may measure fuel tank pressure and a liquid fuel level may be derived from that pressure measurement. It should be appreciated that an indication of the liquid fuel level may be provided to the driver based on a determination via measurement and/or calculation. Controller 12 may generate a fuel level reading that may range between a full fuel tank and an empty fuel tank based on the received measurements and/or the determination. The indication may be displayed to the vehicle operator via a fuel level indicator that may be used by the vehicle operator for fuel tank filling purposes.

Fuel system 200 further includes fuel vapor canister 220 that connects to fuel tank 202 via vent pipe 218. In order to regulate pressure in fuel tank 202, fuel vapor may flow from fuel tank 202 through vent pipe 218 to fuel vapor canister 220. Fuel vapor canister 220 may trap fuel vapor flowing into the canister while allowing air filtered through the canister to be vented to the atmosphere via an air vent (not shown). In some embodiments, the fuel vapor canister may filter fuel vapor with charcoal. The fuel vapor may adhere to the charcoal until the fuel vapor is purged.

Fuel vapor canister saturation may occur responsive to various operating conditions and events. In one example, fuel tank filling may force fuel vapor residing in the fuel tank into the canister causing canister saturation. As another example, heat and/or pressure generated during vehicle operation may cause liquid fuel to evaporate creating fuel vapor which may be transferred into the canister causing saturation.

In order to avoid over saturation of the fuel vapor canister and release of fuel vapor to the atmosphere, fuel vapor may be purged from fuel vapor canister 220 through control of purge valve 222. Fuel vapor may be purged from the fuel vapor canister using engine vacuum created during engine operation. In one example, engine vacuum may be created by actuating throttle valve 64 and upon actuation of purge valve 222, fuel vapor may travel from fuel vapor canister 220 into the intake manifold and enter cylinder(s) 30 for combustion. By introducing fuel vapor into the cylinder and not into the atmosphere fuel economy may be improved.

It should be appreciated that other fuel vapor venting and purging configurations may be implemented in the fuel system discussed above. For example, additional vent pipes and/or canisters may be used to filter and contain fuel vapor. As another example, a fuel vapor purging system may include multiple purge valves.

In some embodiments, a fuel vapor purging strategy may perform fuel vapor purging during low engine loads in order to decrease the impact on engine output. In particular, during fuel vapor purging the amount of fuel vapor entering the cylinders may be unknown. The unknown amount of fuel being combusted may lead to a reduction in accuracy of engine output control, particularly in an air/fuel ratio based engine control strategy. In other words, engine control may be reduced because it is unknown what is in the purge stream until after combustion. Accordingly, fuel vapor purging may be performed under low engine load conditions, such as for example idling conditions, in order to reduce variations in engine output.

During hybrid vehicle operation, in order to improve vehicle efficiency the engine may be shutdown under some conditions. As a result of an engine shutdown condition, no engine vacuum is created in the intake manifold and no combustion occurs. Thus, fuel vapor purging cannot be performed. Accordingly, in a hybrid vehicle, since engine operation is limited, opportunity for fuel vapor purging is also limited.

In an exemplary embodiment, a fuel vapor purging strategy may be applied to the above described engine and fuel system in vehicle that takes advantage of known fuel system related parameters to adjust fuel vapor purging in order to improve efficiency and drivability of the vehicle. Specifically, a determination to purge fuel vapor may be based on the liquid fuel level in the fuel tank and the duration between fuel filling events as part of an adaptive fuel vapor purge strategy. By applying the herein described fuel vapor purge strategy, fuel vapor purging may be conducted in a manner that may improve transparency to the vehicle operator. Further, the strategy may be applied to a hybrid powertrain to reduce the release of fuel vapor emissions to the atmosphere and to improve the operating efficiency of the hybrid powertrain.

The specific routines described below in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated acts or functions may be repeatedly performed depending on the particular strategy being used. Further, these figures may graphically represent code to be programmed into the computer readable storage medium in a controller.

In one example, the amount of fuel vapor currently residing in the fuel tank may be estimated based on the amount of liquid fuel in the fuel tank. The amount of fuel vapor residing in the fuel tank may be used, among other indicators, to define a prioritized purge approach that allows for purging of the fuel vapor canister at a maximum purge rate in order to prevent the release of fuel vapor into the atmosphere, even when the fuel vapor canister is full. By determining the amount of fuel vapor in the fuel tank, the fuel vapor purging strategy may filter and purge fuel vapor generated across the operating range of the vehicle.

Figure 4:
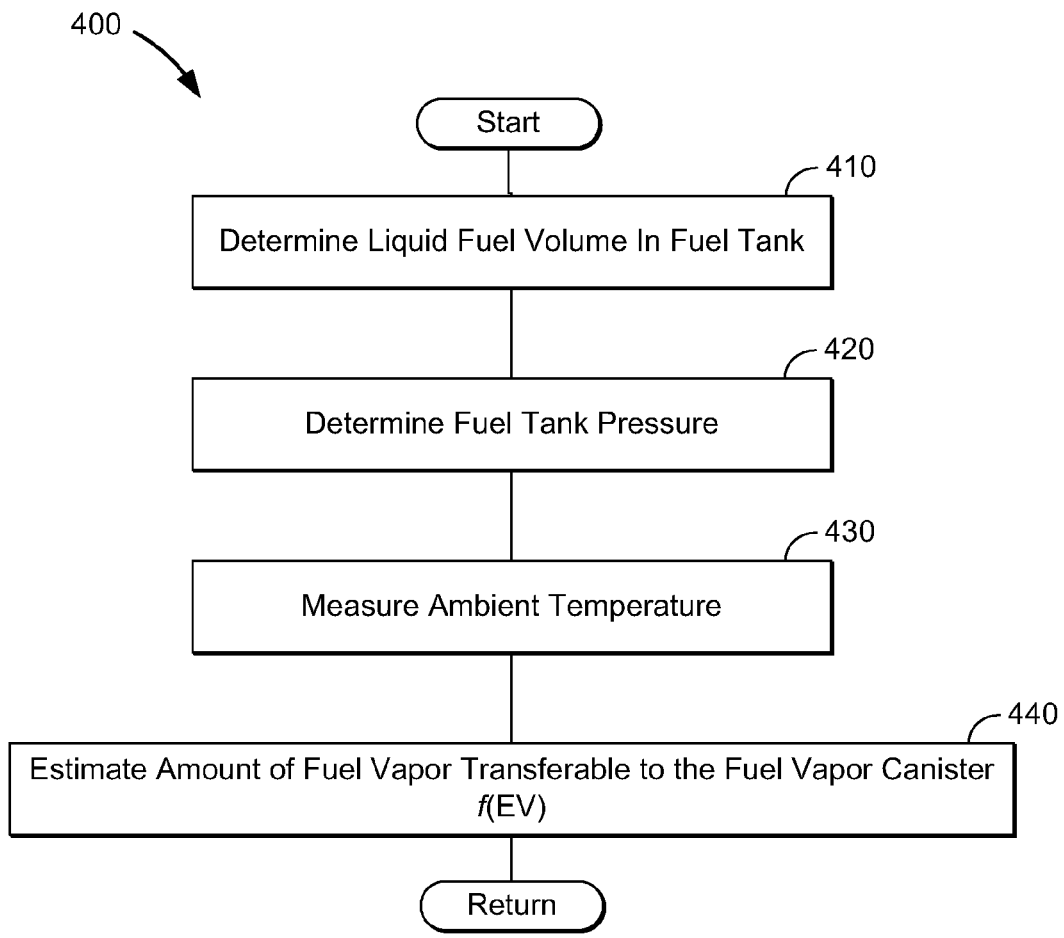
FIG. 4 is a flow diagram that illustrates a routine for determining the amount of fuel vapor in the fuel vapor canister.

FIG. 4 shows high-level routine 400 for determining the amount of fuel vapor residing in the fuel tank that may be transferable to the vapor canister. Routine 400 may be used as part of a fuel vapor purge strategy to determine if fuel vapor purging may be conducted opportunistically in order to not inhibit efficient vehicle operation. In particular, the estimated amount of fuel vapor transferable to the fuel vapor canister may be used to determine a level of urgency or preference at which fuel vapor purging may be performed.

Routine 400 begins at 410, where the volume of the liquid fuel residing in the fuel tank is determined. In some embodiments, the liquid fuel volume may be measured via a fuel level detection device. In some embodiments, the liquid fuel volume may be determined based on calculation or estimation. For example, liquid fuel volume may be derived from measuring fuel tank pressure and estimated fuel consumption since the previous fuel tank fill. The liquid fuel volume may be used to determine the amount of fuel vapor in the fuel tank which may correlate to the amount of fuel vapor transferred to the fuel vapor canister during a liquid fuel filling event. Thus, as liquid fuel is consumed more fuel vapor may exist in the fuel tank which may transfer to the fuel vapor canister. In other words, the more liquid fuel that is in the tank, the smaller amount of fuel vapor that will be transferred to the canister upon fuel tank filling.

Next at 420, the fuel tank pressure may be determined. In some embodiments, the fuel tank pressure may be measured via a pressure sensor. In some embodiments, the fuel tank pressure may be determined based on calculation or estimation. The fuel tank pressure may be used to determine the amount of fuel vapor in the fuel tank.

Next at 430, the ambient temperature may be measured. The ambient temperature may be used to estimate the amount of fuel vapor in the fuel tank. In some embodiments, the amount of fuel vapor in the fuel tank may be determined based on the measured ambient temperature and a forecasted ambient temperature. For example, a forecasted ambient temperature may be based on the time of day, day of year, and/or geographical location. In one example, a forecasted temperature during the middle of the day may be high or increased over a forecasted temperature during the middle of the night. As another example, a forecasted temperature at a day during the winter may be lower than a forecasted temperature at a day during the summer.

Next at 440, the amount of fuel vapor in the fuel tank may be estimated based on a function (f(EV)) of the liquid fuel volume, the fuel tank pressure, and the ambient temperature. Note that in some embodiments, other fuel system operating parameters may be considered when determining the amount of fuel vapor in the fuel tank. The above described routine may be performed repeatedly throughout vehicle operation in order to estimate the amount of fuel vapor in the fuel tank that may be transferred to the fuel vapor canister during a fuel filling event.

In one example, the current fuel tank condition may provide an estimation of the amount of fuel vapor which may be transferred to the fuel vapor canister based on the likelihood of an impending fuel filling event. The fuel tank condition may be used, among other indicators, to deviate from the prioritized purge approach so that the fuel vapor purge rate may be adjusted and/or the duration of fuel vapor purging operations may be reduced. Optionally (or additionally), the frequency of fuel vapor purging operations may be reduced based on the condition of the fuel tank.

Furthermore, the future saturation state of the fuel vapor canister may be determined to adjust the fuel vapor purging strategy from a prioritized purge approach in order to improve operating transparency to the vehicle operator as well as to improve powertrain efficiency. In one example, the future saturation state of the fuel vapor canister may be an estimation of a likelihood of a fuel tank filling event occurring. The future saturation state of the fuel vapor canister may be used in conjunction with the determined amount of fuel vapor residing in the fuel tank to determine when to purge fuel vapor from the fuel vapor canister. The future saturation state of the fuel vapor canister may be learned based on the liquid fuel filling habits of the vehicle operator. The fuel filling event learning routines will be discussed herein with reference to FIGS. 5 and 6.

Figure 5:
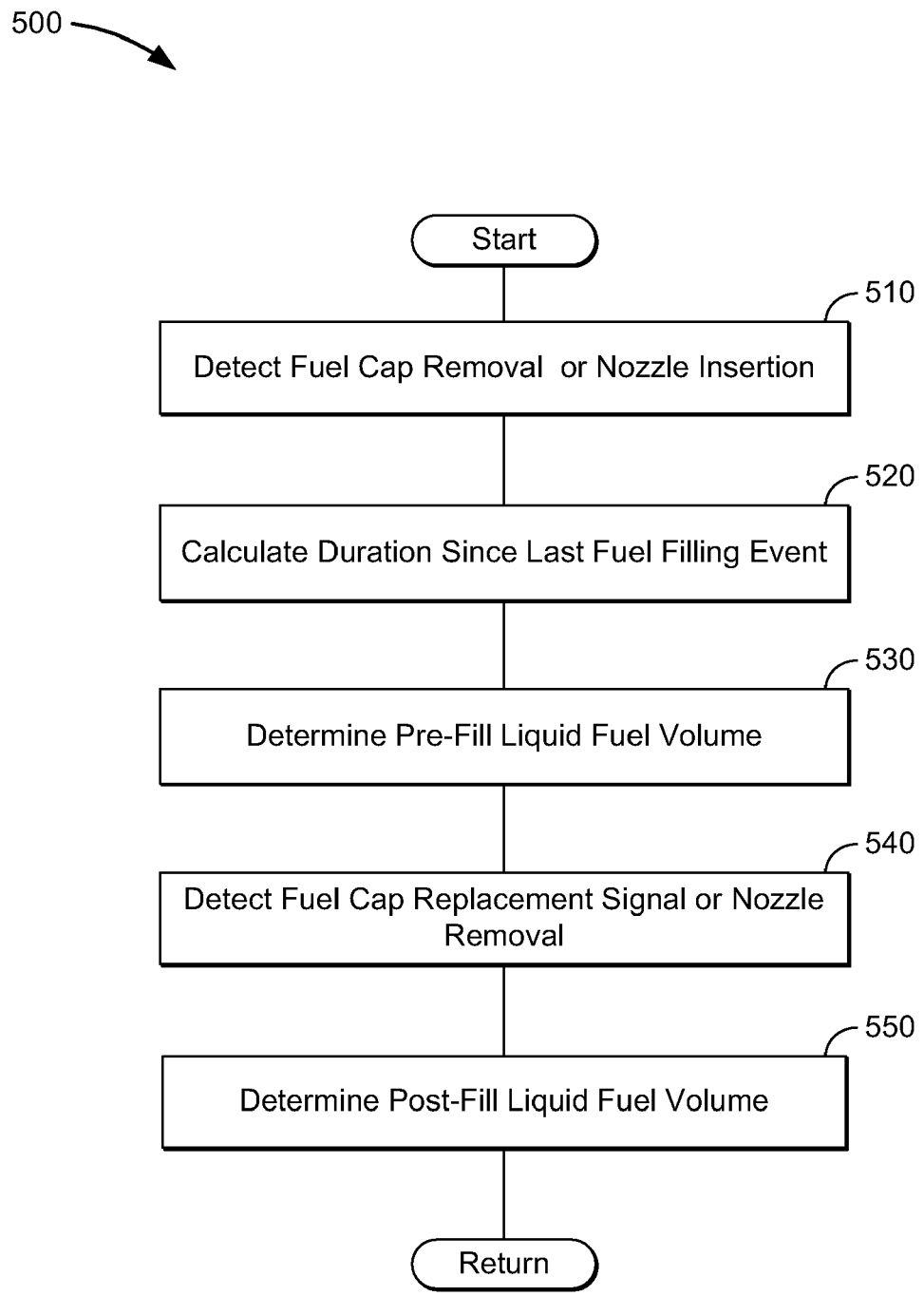
FIG. 5 is a flow diagram that illustrates a routine for monitoring a fuel tank filling events.

Now turning to FIG. 5, an exemplary liquid fuel level monitoring routine is shown. Routine 500 monitors and records various fuel system parameters related to fuel consumption and liquid fuel levels for a particular fuel tank filling event. The routine may be performed repeatedly in order to provide an indication of fuel consumption and fuel tank filling habits that may be used as part of an learning routine which may be used to determine (or estimate) the future saturation state of the fuel vapor canister.

Routine 500 begins at 510, where fuel cap removal is detected by the controller. The fuel cap sensor may send a signal that indicates removal of the fuel cap for fuel filling purposes. Note that the controller may poll repeatedly for this signal until it is detected. Alternatively, in some embodiments, a sensor disposed in the fuel filling tube may detect the insertion of a fuel dispensing nozzle into the fuel filling tube and may send a signal to the controller.

Next at 520, the duration since the previous fuel filling occurrence may be calculated based on the elapsed time since the last fuel cap signal was received. The elapsed time may be used to determine the duration between fuel tank filling occurrences. The duration between fuel filling occurrences may be used to determine the likelihood of the fuel tank being filled with liquid fuel.

Next at 530, the liquid fuel volume is measured and stored in memory. This measurement provides an indication of the liquid fuel volume prior to fuel tank filling. In some embodiments, the liquid fuel volume may be calculated from other fuel tank parameters.

Next at 540, fuel cap replacement may be detected based on receiving a fuel cap signal. The indication may be used, among other signals, to identify that fuel tank filling has occurred. Further, the signal may also be used to reset the timer used to calculate the duration between fuel tank filling events. Alternatively, in some embodiments, a sensor disposed in the fuel filling tube may detect the removal of a fuel dispensing nozzle from the fuel filling tube and may send a signal to the controller.

Next at 550, the liquid fuel volume is measured and stored in memory. The measured liquid fuel volume may be used to determine the amount of fuel added to the fuel tank during fuel tank filling.

It should be appreciated that the above described routine may be repeated numerous times throughout vehicle operation in order to learn the fueling habits of the vehicle operator. Further, the fuel system parameters that are measured and stored in this routine may be representative of a single fuel filling event.

Routine 500 may be performed repeatedly to collect an aggregate amount of data representative of fuel consumption and fuel filling habits that may be considered when determining the current condition of the fuel tank and the future saturation state of the fuel vapor canister as part of the fuel vapor purging strategy.

The fuel filling data aggregated through repeated operation of routine 500 may be used to determine the future saturation state of the fuel vapor canister based on the likelihood of the a fuel tank filling event occurring. Specifically, the determined duration between fuel filling events may correlate to the likelihood of impending fuel tank fill. In other words, as the duration increases so does the likelihood of a fuel tank filling event occurring. Further, the amount of fuel being added during a liquid fuel filling event may be used to determine the amount of fuel vapor that may be transferred to the fuel vapor canister when the fuel tank was filled.

Figure 6:
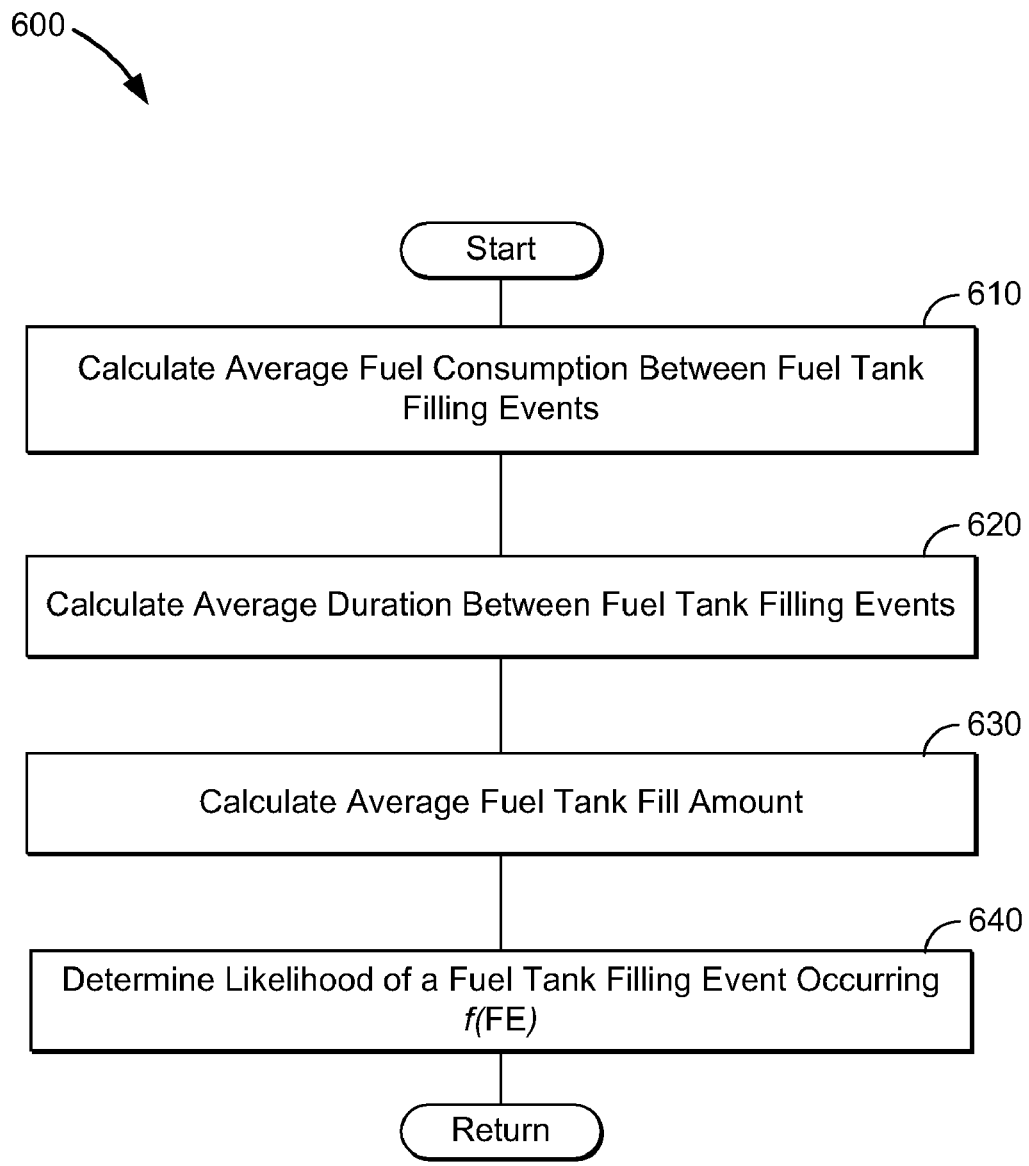
FIG. 6 is a flow diagram that illustrates a routine for determining the amount of fuel vapor entering the fuel vapor canister upon a fuel tank filling event.

FIG. 6 shows high-level routine 600 for determining the future saturation state of a fuel vapor canister based on learned fuel consumption and fuel filling habits derived from aggregate data generated from routine 500. Routine 600 begins at 610, where the average fuel consumption between fuel tank filling events may be calculated. The calculation may be based on the aggregate fuel filling event data collected by repeatedly performing routine 500 described above with reference to FIG. 5. In some cases, engine operation may be considered in the fuel consumption calculation.

Next at 620, the average duration between fuel tank filling events may be calculated. The calculation may be based on the aggregate fuel filling event data collected by repeatedly performing routine 500 described above with reference to FIG. 5. In some cases, the duration may be based on elapsed time. In some cases, the duration may be based on distance of vehicle travel. It should be appreciated that in some embodiments the duration may be based on other metrics.

Next at 630, the average fuel tank filling amount may be calculated. The calculation may be based on the aggregate fuel filling event data collected by repeatedly performing routine 500 described above with reference to FIG. 5. The average amount of liquid fuel may be used to estimate an amount of fuel vapor likely to transfer to the fuel vapor canister upon fuel tank filling.

Next at 640, the likelihood of a fuel tank filling event occurring may be determined from the learned fuel tank filling data. The likelihood of a fuel tank filling event occurring may be based on a function (f(FE)) of, among other parameters, the duration between fuel filling events and the level of liquid fuel in view of the average fuel consumption between fuel tank filling events. It should be appreciated that in some embodiments, other vehicle operating parameters may be considered in f(FE). For example, the time of day may be considered in f(FE). The time of day may be weighted in the function since a fuel filling event may be less likely to occur during the night or early morning. Further, the time of day at which a fuel tank filling event occurs may be a learned parameter monitored in routine 500. Thus, the learned fuel tank filling habits of the vehicle operator may be considered in f(FE).

Routine 600 may be performed repeatedly throughout vehicle operation to determine the likelihood of a fuel tank filling event occurring. The likelihood of a fuel tank filling event occurring (f(FE)) may be considered in conjunction with the transferable fuel vapor upon a fuel tank filling event (f(EV)) to control hybrid vehicle operation as part of a fuel vapor purge strategy. The fuel vapor purge strategy will be in further detail below with reference to FIG. 7.

As discussed above, fuel vapor purging may be limited by engine operation. Thus, by adjusting the fuel vapor purge strategy to reduce the purge rate and/or duration and/or frequency of fuel vapor purging according to the determination made in routines 400 and 600, operation of the IC engine in the hybrid vehicle for the purpose of fuel vapor purging may be reduced which in turn may improve the operating efficiency of the hybrid vehicle. Further, the amount of transferable fuel vapor, the likelihood of a fuel filling event occurring, and the density or content of the fuel vapor being purged may provide an estimation of the future saturation state of the fuel vapor canister which may be used in the fuel vapor purge strategy to perform fuel vapor purging opportunistically during hybrid vehicle operation.

For example, if it is determined that the likelihood of fuel tank filling event occurring is low and/or the amount of transferable fuel vapor is low, then fuel vapor purging may be conducted only if the IC engine is currently operating. In other words, the fuel vapor purge strategy may not operate the IC engine for the purpose of fuel vapor purging. In this way, operating transparency may be improved since the IC engine may not be operated as frequently to purge fuel vapor and a vehicle operator may perceive smoother and/or quieter hybrid vehicle operation.

Furthermore, as discussed above, engine control may be affected during fuel vapor purging since an unknown amount of fuel is being combusted. However, the content or density of fuel vapor being purged may be estimated based on an A/F ratio measured downstream from combustion. Thus, by determining the condition of the fuel tank and the future saturation state of the fuel vapor canister and adjusting the fuel vapor purging strategy to reduce the purge rate and/or duration and/or frequency of fuel vapor purging, engine control accuracy may be maintained.

Figure 7:
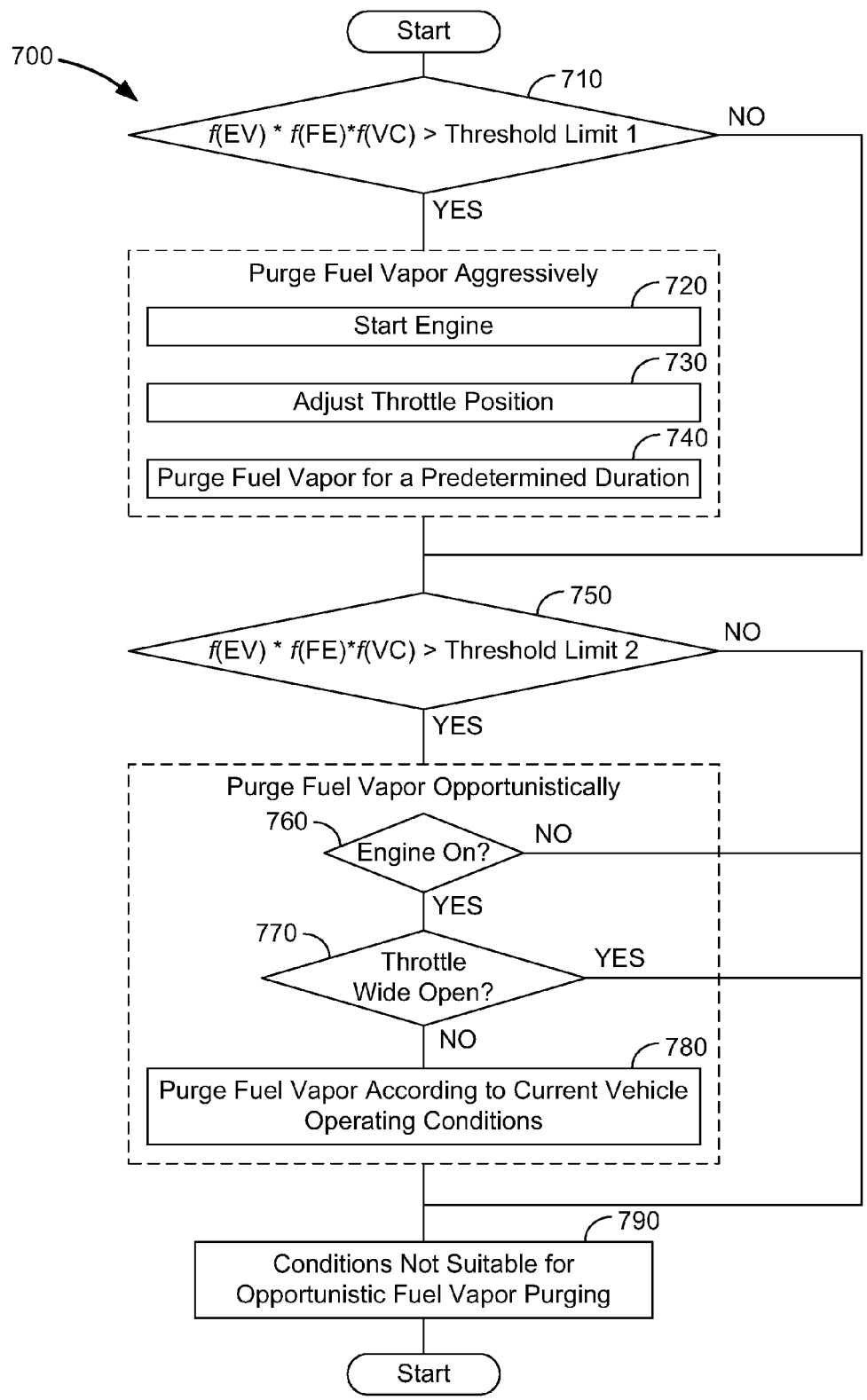
FIG. 7 is a flow diagram that illustrates an exemplary strategy for purging fuel vapor from a fuel vapor canister.

Now turning to FIG. 7, an exemplary embodiment of a fuel vapor purging strategy is shown. Fuel vapor purging routine (or strategy) 700 may take into consideration the current fuel vapor state of the fuel tank and future saturation state of the fuel vapor canister in order to purge the fuel vapor canister without unnecessarily reducing efficiency of the hybrid powertrain or vehicle operating transparency. Specifically, the routine may determine if it is necessary to purge the fuel vapor canister in order to prevent release of fuel vapor emissions into the atmosphere and may adjust engine operation to facilitate the purging. Further, the routine may use the condition of the fuel tank and the future saturation state of the fuel vapor canister to determine if purging may be desirable and/or possible without reducing the operating efficiency of the hybrid powertrain and may adjust fuel vapor purging operations to purge opportunistically or to defer fuel vapor purging operation in favor of more efficient hybrid vehicle operation.

Routine 700 begins at 702, the amount of transferable fuel vapor in the fuel tank (f(EV)), the likelihood of a fuel tank filling event occurring (f(FE)), and a density or content of fuel vapor purged from the fuel vapor canister (f(VC)) may be applied in a function to determine a fuel tank condition parameter that may be compared to a first threshold limit (Threshold Limit 1). The first threshold limit may define an upper region where the fuel vapor canister is substantially filled to capacity with fuel vapor. Under some conditions where the fuel vapor canister is at or beyond the first threshold limit, the addition of fuel vapor to the fuel vapor canister may cause a release of fuel vapor to the atmosphere. As discussed above, f(EV) and f(FE) may be determined according to the routines described in FIGS. 4-6. Further, f(VC) may be determined based on an amount (or density) of fuel vapor being purged from the fuel vapor canister. In one example, f(VC) may be determined based on the A/F ratio measured after combustion to determine the amount of fuel vapor that is purged from the canister. By considering the purge density of the fuel vapor purged from the fuel vapor canister a future state of the fuel vapor canister may be estimated. For example, if fuel vapor purging is performed and the density of purged fuel vapors decreases then it may be projected that the amount of fuel vapors residing in the fuel vapor canister is being reduced and f(VC) may be reduced.

Accordingly, if it is determined that the fuel tank condition parameter (f(EV)*f(FE)*f(VC)) meets or exceeds the first threshold limit, routine 700 moves to 720 where aggressive (or prioritized) fuel vapor purging may be performed. Otherwise if it is determined that fuel tank condition parameter is less than the first threshold routine 700 moves to 750.

Note that the first threshold limit may be predetermined based on various fuel system parameters, such as for example, capacity of the fuel vapor canister, ambient temperature, vehicle operating mode, etc. In some embodiments, the first threshold limit may be calibratible such that the limit may be adjusted based on fuel system component lifespan and functionality parameters as well as other suitable fuel system parameters.

In some embodiments, the fuel tank condition parameter (f(EV)*f(FE)*f(VC)) may be a function based on various fuel system parameters as discussed above with reference to FIGS. 4-6. In some embodiments, f(FE) may be a weighted percentage that may influence f(EV) and/or f(VC). In some embodiments, the functions may be used to generate an estimate that may be compared to the threshold limit.

Continuing with routine 700, if it is determined that the fuel vapor canister is substantially filled to capacity or likely to be filled with fuel vapor, aggressive (or prioritized) fuel vapor purging may be performed in order to prevent a release of fuel vapor to the atmosphere. Fuel vapor may be considered to be purged aggressively because hybrid vehicle operation may be interrupted in favor of the fuel vapor purging in order to prevent an increase in fuel vapor emissions. In other words, fuel vapor purging may have priority over gains in operating efficiency from hybrid electric or wide open throttle operation.

At 720, fuel vapor purging operation may be initiated and the IC engine may be started so that fuel vapor purged from the fuel vapor canister may be combusted.

Next at 730, the throttle valve position may be adjusted to provide engine vacuum to draw fuel vapor released from the fuel vapor canister in the cylinders for combustion. Under some conditions, the throttle valve may be positioned to generate a maximum vacuum to draw out fuel vapor from the fuel vapor canister so that the fuel vapor canister may be purged quickly.

Next at 740, fuel vapor purging may be initiated via actuation of the fuel vapor purge valve. Fuel vapor purging may be performed for a predetermined duration. In some embodiments, the duration may be indicative of purging until an estimated amount of fuel vapor residing in the fuel vapor canister is below a desired amount. In some embodiments, the duration may be a predetermined amount of time. In some embodiments, the duration may be based on combustion cycles or another suitable engine operation parameter, such as the vapor content of the purge flow (e.g., if the vapor content is low, then aggressive purge may be transitioned into opportunistic or no purge).

At 750, the fuel tank condition parameter (f(EV)*f(FE)*f(VC)) may be compared to a second threshold limit (Threshold Limit 2). The second threshold limit may be less than the first threshold limit and may define a middle region where the fuel vapor canister contains some fuel vapor, but the fuel vapor canister may still have a capacity to receive more fuel vapor from the fuel tank. In this region, fuel vapor may be selectively purged to increase the available capacity of the fuel vapor canister. However, in this region, since the fuel vapor canister has the capacity to receive more fuel vapor without releasing fuel vapor to the atmosphere, fuel vapor purging may be dictated by engine operation. In other words, when the fuel tank condition parameter is determined to be in the middle region, fuel vapor purging may only be performed according to current vehicle operating conditions. For example, if the hybrid vehicle is operating in an electric propulsion mode and the engine is not operating, fuel vapor purging may be deferred in favor of gains in operating efficiency through hybrid operation.

Thus, if it is determined that the fuel tank condition parameter meets or exceeds the second threshold limit, then routine 700 moves to 760 and opportunistic fuel vapor purging may be performed. Otherwise, it may be determined that the fuel vapor canister is in a third region with a low amount of fuel vapor residing in the fuel vapor canister and routine 700 moves to 790.

At 760, it may be determined if the engine is operating. The engine may be checked for operation so that hybrid operation is not interrupted strictly for fuel vapor purging purposes. If it is determined that the engine is operating, then routine 700 moves to 770. Otherwise, if it is determined that the engine is not operating the routine ends.

Next at 770, it may be determined if the throttle valve is in a wide open position. If it is determined that the throttle is wide open then no engine vacuum is created and fuel vapor released from the fuel vapor canister may not travel into the cylinder(s) for combustion. Moreover, the throttle valve would have to be positioned away from a wide open position to create engine vacuum which may affect the operating efficiency of the engine. Accordingly, if the throttle valve is wide open fuel vapor purging operations are deferred in favor of efficient engine operation and the routine ends. Otherwise, if it is determined that the throttle is not wide open then it may be assessed that the conditions are suitable for fuel vapor purging and the routine continues to 780 where fuel vapor purging may be performed.

At 780, purging of the fuel vapor canister is initiated. The operation may begin by opening the fuel vapor purge valve. Fuel vapor may enter cylinders of the engine at rate based on the condition of the throttle valve. Fuel vapor purging may be conducted for a predetermined duration or until engine operation changes and conditions become unsuitable for fuel vapor purging. In one example, fuel vapor purging may be halted upon the throttle valve being adjusted to a wide open position. As another example, fuel vapor purging may be halted when operation of the IC engine stops. If fuel vapor purging is not interrupted by a change in vehicle operation, fuel vapor purging may be conducted until the fuel vapor canister is substantially empty or below a desired level, or the conditions for opportunistic purging are not met. In some cases, the duration of fuel vapor purging may be based on an estimate of the amount of fuel vapor residing in the fuel vapor canister which may be derived from various fuel vapor purge parameters, such as for example, purge rate, canister capacity, ambient temperature, etc.

At 790, a condition of the fuel tank and/or vehicle operation may not be suitable for opportunistic fuel vapor purging. In some embodiments, opportunistic fuel vapor purging may not be conducted because it is determined that the current state of the fuel vapor canister is substantially empty or the amount of fuel vapor is below a predetermined level.

In the above described fuel vapor purging strategy, a prioritized purge approach may be performed in order to prevent the release of fuel vapor emissions to the atmosphere. In particular, the prioritized purge approach may interrupt hybrid operation in favor of preventing an increase in vehicle emissions due to the release of fuel vapor to the atmosphere. In other words, the prioritized purge approach may be performed in favor of electric operation or other efficient operation of the hybrid vehicle in order to prevent an increase in emissions.

Furthermore, the fuel vapor purging strategy may deviate from the prioritized purge approach when the fuel vapor canister is determined not to be full and may instead follow an opportunistic purge approach. The opportunistic purge approach may permit fuel vapor purging to occur without lowering hybrid powertrain efficiency. In particular, opportunistic fuel vapor purging may be deferred in favor of hybrid operation or other more efficient engine operation when possible. Moreover, opportunistic fuel vapor purging may be conducted according to current operating conditions. By purging according to the condition of the fuel tank, more specifically, the amount of fuel vapor residing in the fuel tank and the likelihood of a fuel tank filling event occurring, fuel vapor purging (i.e. rate/duration/frequency) may be adjusted to improve operating efficiency of the hybrid vehicle and operating transparency to the vehicle operator. In this way, the frequency of engine operation solely for the purpose of fuel vapor purging may be reduced and efficiency of the hybrid powertrain may be maintained.

Note that in some embodiments, the above described fuel vapor purging strategy may be incorporated into an engine control strategy and/or a hybrid powertrain control strategy.

Figure 8:
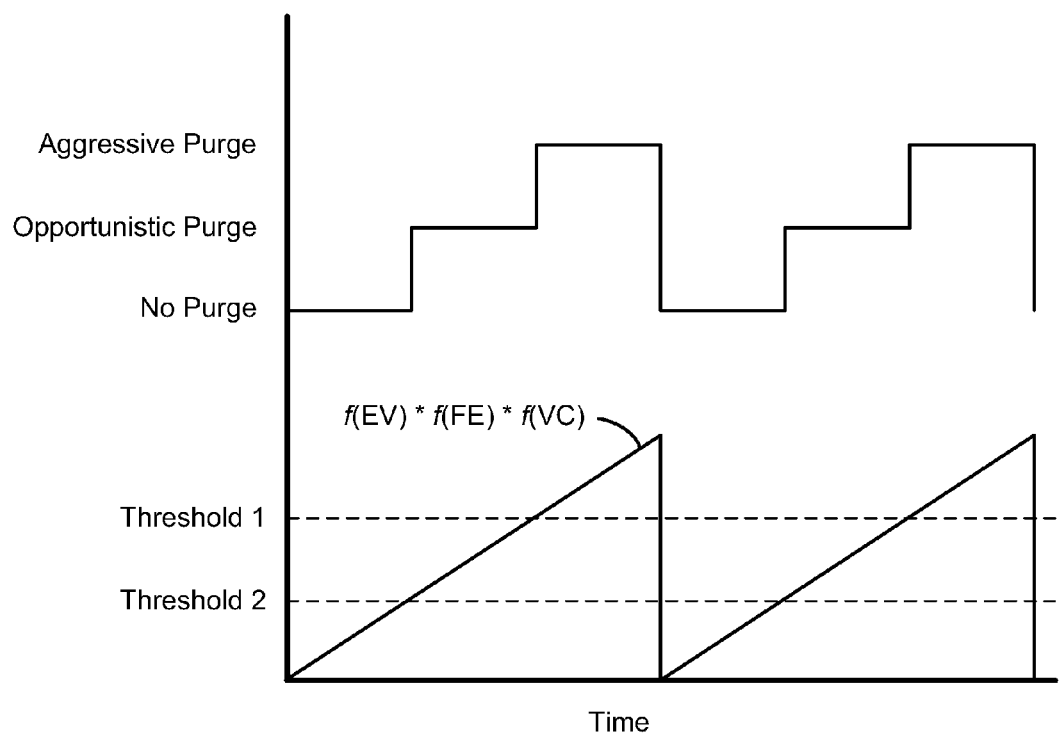
FIG. 8 is a graphical representation of a default fuel vapor purging approach compared to an adaptive fuel vapor purging approach.

FIG. 8 graphically illustrates fuel vapor purging operation according to the various fuel vapor purging approaches in the fuel vapor purging strategy described above with reference to FIG. 7. In particular, the fuel tank condition parameter (f(EV)*f(FE)*f(VC)) is graphically represented throughout vehicle operation. The fuel tank condition parameter may be categorized according to three different fuel vapor purging regions based on the first threshold (Threshold 1) and the second threshold (Threshold 2). Namely, when the fuel tank condition parameter is above the first threshold in a first region that is indicative of the fuel vapor canister being substantially full, aggressive fuel vapor purging may be performed. The fuel tank condition parameter may be in a second region indicative of the fuel vapor canister being partially filled when the fuel tank condition parameter is between the second threshold and the first threshold, and opportunistic fuel vapor purging may be performed. The fuel tank condition parameter may be in a third region indicative of the fuel vapor canister having a low amount of fuel vapor or being substantially empty when the fuel tank condition parameter is below the second threshold, an no fuel vapor purging may be performed.

Thus, by adjusting fuel vapor purging operation based on the fuel tank condition parameter fuel vapor purging may be performed to reduce or substantially eliminate the amount of fuel vapors released to the atmosphere. Moreover, fuel vapor purging operations may be reduced or modified to improve operating efficiency of the vehicle as well as to improve operating transparency perceived by the vehicle operator.

It should be appreciated that in some embodiments the fuel vapor purging strategy may include all of the above described routines. Alternatively, in some embodiments the fuel vapor purging strategy may include only selected routines to adjust the fuel vapor purging strategy.

Furthermore, it should be appreciated that the above described fuel vapor purging strategy may be applied to a non-hybrid electric vehicle (e.g. a vehicle propelled only by an internal combustion engine). In this strategy, wide open throttle operation may be interrupted in favor of fuel vapor purging operation when a fuel tank condition parameter meets or exceeds a threshold limit. Further, if the fuel tank condition parameter does not meet or exceed the threshold limit fuel vapors may be selectively purged when the vehicle not operating in a wide open throttle mode.

As described above, the fuel tank condition parameter may be based on, among other parameters, an amount of liquid fuel residing in the fuel tank which may be used to estimate an amount fuel vapor transferable to the fuel vapor canister upon a fuel tank filling event and the duration since a previous fuel tank filling event which may be used to estimate the likelihood of a fuel tank filling event occurring. In some embodiments, the fuel tank condition parameter may be based on the fuel vapor content that is being purged from the fuel vapor canister.

Accordingly, vehicle operation may be adjusted away from wide open throttle operation to purge fuel vapor in order to prevent a release of fuel vapor to the atmosphere. Moreover, fuel vapor purging may be performed opportunistically according to current vehicle operation without intrusive interruption for the purpose of fuel vapor purging. In this way, operating efficiency and robustness may be improved since the frequency, rate, and/or duration of fuel vapor purging may be reduced.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling fuel vapor purging in a hybrid electric vehicle, the method comprising:
   selectively operating an internal combustion engine;
   during operation of the internal combustion engine, performing a fuel vapor purge operation based on an amount of liquid fuel in a fuel tank of the hybrid electric vehicle and a duration between liquid fuel filling events.

2. The method of claim 1 further comprising:
   comparing the amount of liquid fuel in the fuel tank and the duration between liquid fuel filling events to a threshold limit;
   in response to the amount of liquid fuel in the fuel tank and the duration between liquid fuel filling events exceeding the threshold limit, initiating operation of the internal combustion engine; and
   purging fuel vapor from the fuel vapor canister for a predetermined duration.

3. The method of claim 2 further comprising:
   in response to the amount of liquid fuel in the fuel tank and the duration between liquid fuel filling events being less than the threshold limit, selectively purging fuel vapor from the fuel vapor canister based on an operating condition of the engine.

4. The method of claim 3 wherein the operating condition includes combustion in at least one cylinder of the internal combustion engine and a throttle valve of the internal combustion engine positioned not at wide open.

5. The method of claim 4 wherein selective fuel vapor purging is halted responsive to a change in operating mode of the hybrid electric vehicle.

6. The method of claim 4 wherein the predetermined duration includes a predetermined amount of time.

* * * * *